Aug. 8, 1961 P. SCHEUZGER 2,995,623

TRANSCEIVER RECORDING DEVICE ASSEMBLY

Filed Oct. 15, 1959

INVENTOR.
PETER SCHEUZGER
BY
Thomas E. Dorn
ATTY.

United States Patent Office 2,995,623
Patented Aug. 8, 1961

2,995,623
TRANSCEIVER RECORDING DEVICE
ASSEMBLY
Peter Scheuzger, Evanston, Ill., assignor to Comptometer Corporation, Chicago, Ill., a corporation of Illinois
Filed Oct. 15, 1959, Ser. No. 846,607
7 Claims. (Cl. 178—18)

This invention relates to recording devices, and more particularly to a new and improved recording pen structure for a transceiver in a graphic communication system.

In a graphic communication system, messages or other data are transcribed at a transmitter, usually by hand, and are simultaneously reproduced by a recording pen at a receiver. Preferably, the transmitter pen records the desired data directly upon a sheet of paper or other recording medium so that duplicate records are prepared simultaneously at both the transmitting and the receiving stations. In many instances it is necessary to be able to transmit data and to receive data from a common point. Since many of the electronic devices and circuits used for transmitting and receiving are essentially similar to each other, and since it is not usually necessary to transmit and receive simultaneously at the same location, a transceiver unit may be advantageously employed at locations of this kind to provide for both transmission and reception of recorded messages.

Transmitter and receiver requirements, as applied to the recording pen of a transceiver for a graphic communication system, are substantially different from each other, and, in fact, present certain substantial problems in the construction of the recording pen for the transceiver unit. Thus, in a transmitter the weight of the pen unit is not a particularly critical factor, since the motive power for the pen is supplied from an external source, the hand of the operator. The receiver pen, however, must be capable of rapid movements and of high rates of acceleration in reproducing a message, and should be of very light weight in order to eliminate, as far as possible, the effect of inertia of the pen upon the recorded message. The recording device, at the transmitter, must include some means for generating a signal to indicate whether or not the pen is actually in contact with the recording medium, since in many instances the pen may be moved without making a mark upon the recording medium, as in the intervals between words in a written message. There is no need for a sensing switch or other device, at the receiver, for generating a signal of this kind, which is usually referred to as a pen-lift signal and is referred to hereinafter as a pen-contact signal. On the other hand, some provision must be made for mechanically moving the receiver pen into and out of contact with a recording medium in response to a received signal. Of course, in a graphic communication transceiver, it is highly undesirable to mount a complex and cumbersome switching device or other sensing device on the pen for the purpose of generating a pen-contact signal, since the device may interfere with operation of the pen when the transceiver is in use as a receiver.

In a unit to be used as a transmitter only, the recording device may be equipped permanently with an actuator or stylus member of suitable size and configuration which may be grasped by the operator for the purpose of writing a message. On the other hand, at a receiver, this member not only is not needed but would seriously interfere with operation of the receiver. In previously known transmitter pen structures, it has been customary to provide an electrical connection to the pen itself, which is usually of a size comparable to an ordinary fountain pen, but an arrangement of this kind is not particularly desirable at a transceiver where this part of the recording pen may be removed for substantial periods of operation. Nonetheless, in a unit to be used as a transceiver, some positive means must be afforded for generating a pen-lift signal, as described hereinabove, in order to insure accurate operation of the graphic communication system.

It is a principal object of the invention, therefore, to construct a new and improved recording pen for a graphic communication system transceiver which effectively meets and combines all of the aforementioned requirements for both transmitter and receiver operation.

Another object of the invention is to provide a new and improved transceiver recording pen, for a graphic communication system, which is light in weight, yet adaptable for both transmission and reception of written messages.

A particular object of the invention is to incorporate a sensing switch for developing a pen-contact signal in the recording pen of a graphic communication system, the switch being composed primarily of parts of the pen structure per se and requiring no electrical connections to any part of the recording apparatus that is manually operated by the transmitter operator.

A specific object of the invention is to afford a simple and convenient means for adjusting the sensitivity of a pen-contact switching device incorporated in a recording pen structure of a graphic communication system transceiver.

Another object of the invention is to provide a new and improved recording pen-contact device for a graphic communication system which is simple and economical in construction yet which affords substantial operating advantages as compared with previously known constructions.

Other and further objects of the present invention will be apparent from the following description and claims and are illustrated in the accompanying drawings, which, by way of illustration, show a preferred embodiment of the present invention and the principles thereof and is now considered to be the best mode for applying these principles. Other embodiments of the invention embodying the same or equivalent principles may be used and structural changes may be made as desired by those skilled in the art without departing from the present invention.

Figure 1:
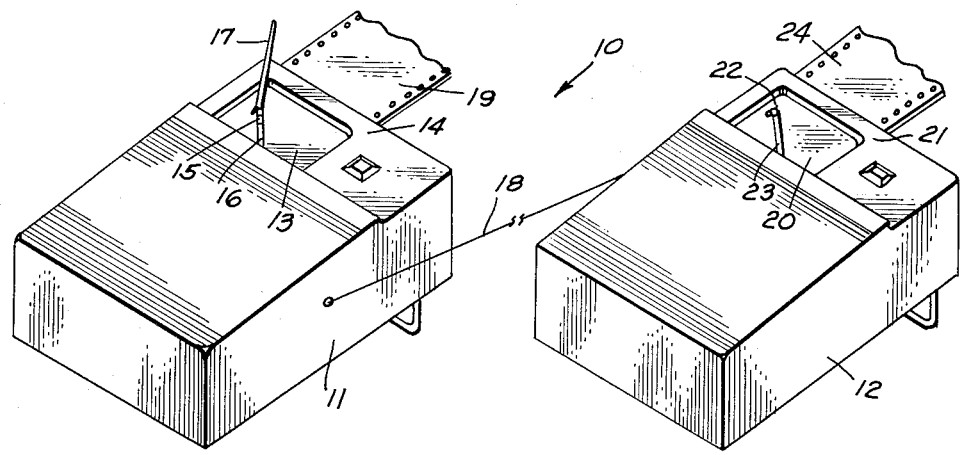
FIG. 1 is a perspective view of a graphic communication system in which the present invention may be incorporated.

The communication system 10 illustrated in FIG. 1 comprises a transmitting station 11 and a receiving station 12. In a typical system, the stations 11 and 12 may each comprise a transceiver unit capable of operation as either a receiver or a transmitter.

The transceiver 11 includes a writing surface 13 which is encompassed by a frame 14; a writing pen 15 is mounted upon a support arm or link 16 for movement into and out of engagement with the writing surface 13. Stylus 15 is also movable transversely of the writing surface and is provided with a removable pen-like actuator or stylus 17. Thus, manual control of the pen 15 by means of the stylus or actuator 17 permits the transcription of a message upon a recording medium such as the paper web 19 supported upon the writing surface 13. The message may comprise words, sketches, or any other data capable of reproduction by the stylus 15. The support arm 16 constitutes a part of a linkage system which controls the operation of electrical circuits within the transmitter unit 11; these circuits are utilized to develop suitable stylus-control signals which may be transmitted to the unit 12 as by a conductive line 18 interconnecting the two stations of the system.

The unit 12 includes a writing surface 20 which is essentially similar in configuration to the writing surface 13 and which is bounded by a frame 21. A recording pen 22 is mounted upon a support arm or link 23 for movement into and out of contact with a paper web or other recording medium 24 supported on the writing surface 20 to inscribe a message or other data upon the paper. A stylus or manual actuator may also be used to operate the pen 22 when the unit 12 is employed as a receiver. In general, the structural details and transmission system utilized in the communication apparatus of FIG. 1 are not critical with respect to the present invention. Preferably, the communication apparatus is similar to that described and claims in United States Patent No. 2,583,535 to Robert Adler, issued January 29, 1952 and in United States Patent No. 2,649,503 to Robert Adler, issued August 18, 1953; both of these patents are assigned to the same assignee as the present invention. Accordingly, reference may be had to these patents and to other previously known graphic recording systems to determine the general construction and operation of the system of FIG. 1.

As noted hereinabove, the writing surface 13 of the transceiver 11 is covered with a suitable recording medium 19 which preferably comprises ordinary paper, and the writing surface 20 of the unit 12 is covered with the paper web 24. The data to be transmitted is written, drawn, or otherwise inscribed on the recording medium at the writing surface 13, assuming unit 11 is used as the transmitter. The movements of the stylus or pen 15 in transcribing this data are translated into electrical control signals which are transmitted to the station 12. In the unit 12, these control signals are utilized to control suitable apparatus which moves the recording pen 22 across the writing surface 20 and into and out of contact therewith in synchronism with movements of the pen 15. Thus, the message transcribed at the unit 11 is reproduced in essentially its original form at the unit 12. Operation is essentially similar when the unit 12 is employed as a transmitter and unit 11 functions as a receiver.

Figure 2:
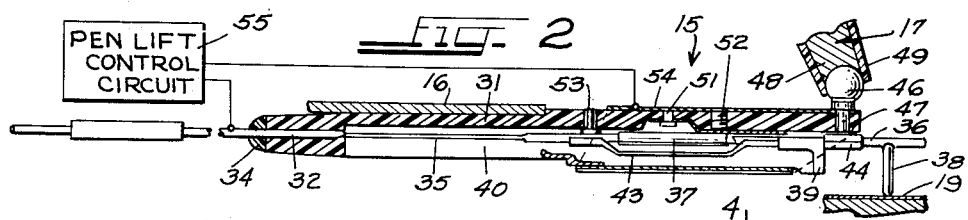
FIG. 2 is a sectional elevation view of a transceiver recording pen constructed in accordance with a preferred embodiment of the invention.
Figure 3:
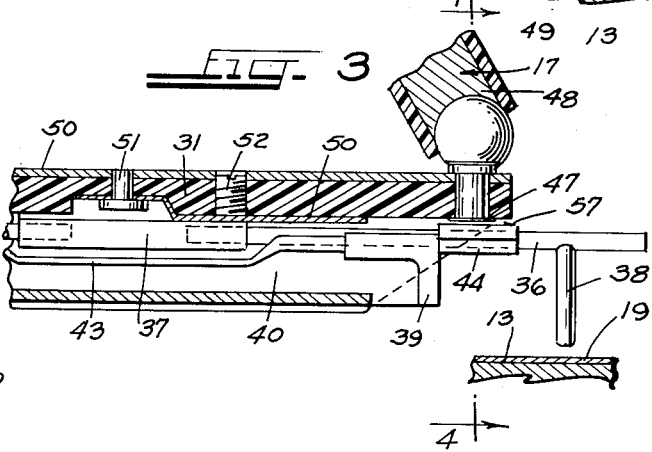
FIG. 3 is a sectional view similar to FIG. 2, but drawn to an enlarged scale to show further details of construction.
Figure 4:
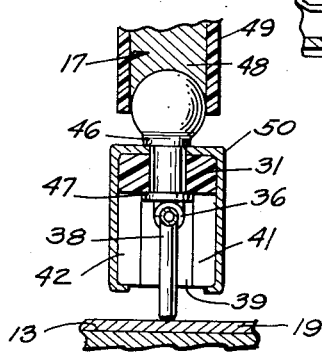
FIG. 4 is a detail sectional view taken approximately along line 4—4 in FIG. 3.

FIGS. 2, 3 and 4 show in detail the construction of the transceiver pen 15, which may be the same as the pen 22, constructed in accordance with a preferred embodiment of the invention. As shown in these figures, the pen 15 includes a support member 31 which is affixed to the pen arm 16 by suitable means such as screws, rivets, or the like (not shown). Preferably, the support member 31 is formed from a molded plastic material and, in any event, should be fabricated from an insulating material for reasons set forth more fully hereinafter. The writing element of the pen assembly 15 comprises an elongated capillary tube 32 which extends through a boss 33 at the mounting end of the pen assembly and along a channel 40 in the support member. The tube 32 is cemented securely to the member 31 as generally indicated by the reference numeral 34. The capillary tube 32, sometimes referred to hereinafter as the ink supply tube, is fabricated from an electrically conductive material, and, in a preferred construction, may be formed from No. 403 stainless steel tubing having an inside diameter of approximately 0.02 inch. A section 35 of the ink supply tube 32 may be flattened to some extent to increase the compliance of the tubing in a vertical direction, since it is desirable that the tubing be relatively highly compliant in this direction.

The ink supply tube 32 is one section of an ink conduit which extends throughout the length of the pen assembly 15. In the illustrated construction, the forward or nib end 36 of the ink conduit is connected to the supply tube 32 by a flexible plastic tube 37. The plastic tube 37 may be mounted on the metal tubes 32 and 36 simply by pressing the plastic tubing onto the metal tubes, although it may be cemented to the two sections of the metal ink conduit if desired. The flexible plastic tubing 37, which may be formed from vinyl polychloride or other suitable plastic, affords even higher compliance for the pen than would otherwise be possible. A writing member or nib 38 is connected to the nib end 36 of the ink conduit and is employed to conduct ink from the ink supply tube to the writing medium 19 of the transceiver. In a typical construction, the nib member 38 may be fabricated from stainless steel tubing of approximately 0.01 inch inside diameter, which may be gold soldered or otherwise suitably affixed to the supply tube section 36.

A key 39 is affixed to the ink conduit section 36 in spaced relation to the nib 38. The key 39 engages two depending side portions 41 and 42 (FIG. 4) of the support member 31, these being the sides of the channel 40, and serves as a guide member which limits movement of the cantilever ink conduit 32, 36 and the nib 38 to a direction approximately normal to the recording medium 19 on the recording surface 13. Thus, the key 39 prevents lateral movement of the pen relative to the pen support 31, in the pen assembly 15, permitting use of a highly compliant pen structure without introducing errors which would otherwise result from lateral movement of the pen relative to its support member.

As explained more fully hereinafter, the writing element comprising the ink conduit sections 32 and 36 constitutes a part of a pen-contact sensing switch which is incorporated in the pen-lift assembly 15. Consequently, it is necessary to interconnect the tubing sections 32 and 36 electrically, and this is accomplished by a shunt connector element 43 which is electrically connected to the two conductive tubing sections and which by-passes the plastic tube 37. At the forward end of the pen assembly, between the key member 39 and the nib 38, a first contact element 44 is mounted upon the ink supply tube section 36. Preferably, the sleeve 44 is formed as a split sleeve from a highly conductive material such as coin silver, and is soldered or otherwise suitably secured to the tubing 36. The electrical by-pass element 43, on the other hand, is preferably formed from a relatively resilient conductive material, such as beryllium copper, and also may be soldered or otherwise suitably secured to the two tubing sections 32 and 36.

In order to use the recording pen assembly 15 for transmitter operation, it is necessary to provide some means for mounting the actuator or stylus 17 thereon. In the illustrated embodiment, this is accomplished by a magnetic mounting system of the kind described and claimed in the co-pending application of Myron L. Anthony, Serial No. 676,816, filed August 7, 1957, now Patent No. 2,937,917, issued May 24, 1960. The magnetic mounting arrangement includes a magnetic keeper member 46 which is mounted on the forward end of the support member 31, immediately above the contact sleeve 44. The lower portion of the magnetic keeper member 46 comprises a contact element 47 which is aligned with the contact sleeve 44, the contact elements 44 and 47 comprising the contacts of a pen-contact switch, the operation of the switch being described in detail hereinafter. The keeper element 46 is engaged by a concave pole piece 48 mounted in the actuator member 17, a non-magnetic sleeve 49 being disposed in encompassing relation to the pole piece 48 to afford a coupling of the kind described and claimed in the aforementioned application of Myron L. Anthony.

A spring blade 50 is mounted upon the support member 31 between the writing element and the support member of the pen assembly 15. The blade 50 is secured to the support member 31 by means of a rivet 51, although other suitable mounting means may be employed if desired.

An adjusting set screw 52 is mounted in the support member 31, as best shown in FIG. 3, in position to engage the spring blade 50 to adjust the vertical position of the spring blade and hence adjust the position of the contact sleeve 44 relative to the contact element 47. It is also necessary to provide some means for raising and lowering the pen relative to the support member 41 when the pen assembly 15 is employed for receiver operation. In the illustrated arrangement this means comprises a plunger 53 which is slidably mounted in the support member 31 in position to engage the ink conduit 32, the operating mechanism for the plunger 53 not being illustrated because it does not constitute a part of the present invention.

A conductive shield 54 is mounted upon the support member 31 and is disposed in encompassing relation to the operating end of the pen structure. In addition, the shield 54 is electrically connected to the keeper member 46 and hence to the contact element 47 which forms a part of the keeper member. The sleeve 54 is electrically connected to a pen-contact control circuit 55, as schematically illustrated in FIG. 2. In practice, the sleeve 54 may comprise a ground terminal for the control circuit 55. The ink supply tube 32, on the other hand, is also connected to the pen-lift control circuit 55 as indicated in FIG. 2.

Operation of the pen assembly 15, when the transceiver in which it is incorporated is employed as a receiver, is substantially conventional. Thus, in receiver operation, the pen arm 16 is employed to move the pen assembly 15 across the writing surface 13 in the usual manner. A suitable operating mechanism, not shown, is employed to operate the plunger 53, in response to a received pen contact signal to press the tubing 32 downwardly and bring the nib 38 into contact with the recording medium 19. Writing on the recording medium 19 is, of course, effected by ink which flows, primarily by capillary action, through the tubing sections 32, 37 and 36 to the nib 38 from a suitable ink supply source, not illustrated in the drawings.

For transmitter operation, on the other hand, the pen assembly 15 forms an integral and important part of the electrical operating circuit of the transceiver unit. For use in transmitter operation, the actuator or stylus 17 is connected to the keeper 46 as shown in FIGS. 2 and 3 to afford the operator a means for moving the pen across the writing surface 13. As long as the operator exerts no substantial downward pressure on the stylus 17, the contact elements 44 and 47 remain separated from each other by a relatively small spacing, as indicated by reference numeral 57. Under these circumstances the pen-contact control signal generated by the circuit 55 indicates to a receiver which may be connected to the transceiver unit that the recording medium is not being marked.

To record data upon the writing surface 19, however, the operator presses downwardly on the stylus 17. When this is done, the entire assembly 15 tends to move downwardly toward the writing surface 13 and toward the recording medium 19. After the pen assembly moves downwardly through a short distance the nib 38 engages the recording medium 19, so that its movement is arrested. Because of the high vertical compliance of the writing element, comprising the tubing sections 32 and 36 and the flexible connection 37, only an extremely light additional pressure is necessary to cause the ink conduit to bend, bringing the two contact elements 44 and 47 together. In fact, this increment of additional pressure is so small that it is virtually impossible for an operator to bring the nib 38 into contact with the recording medium 19 without closing the sensing switch contacts 44 and 47. As soon as these contacts close, an electrical circuit is completed to the pen-contact control circuit 55, which is then conditioned to generate a pen-contact signal indicative of engagement of the pen nib 38 with the recording medium 19.

The switching contacts for the pen assembly 15 are shown in open condition in FIG. 3 and in closed condition in FIG. 4. As illustrated by these figures, and particularly FIG. 3, the air gap or spacing 57 between the contact elements 44 and 47 is quite small. In order to achieve the desired sensitivity in operation of the pen-contact switch, it is essential that this space be held to a relatively small value. On the other hand, it should not be too small, since foreign matter entering the gap 57 might tend to short out the switch. By adjusting the set screw 52, the writing element portion of the pen assembly can be deflected downwardly to an extent sufficient to achieve the exact desired spacing or air gap 57 between the switching contacts. Preferably, the spacing is of the order of 0.01 inch.

The pen assembly 15 is extremely light in weight, being constructed, as it is, of a relatively few number of parts all of which may be small in size. As compared with the portions of the structure which are utilized directly in the writing operation, and therefore may be considered as necessary for conventional receiver operation, the switch portion of the pen assembly includes virtually no additional parts. In fact, the only additional parts directly attributable to the electrical operation of the pen assembly are the contact element 44 and the by-pass blade 43, and the latter also serves some purpose with respect to the writing function in that it makes it possible to obtain a higher compliance for vertical movement than would be available using a complete metal tube for the ink supply tube, while at the same time maintaining enough rigidity and stiffness in the tube to permit effective operation of the pen. Even the set screw 52 is a useful element as far as receiver operation is concerned, since it provides a convenient and effective means for adjusting the height of the pen nib 38 relative to the recording medium 19. Of course, with the illustrated arrangement, there is no need for any electrical connection to the stylus or actuator member 17.

As noted hereinabove, the flexible plastic tube 37, in cooperation with the blade 43, makes it possible to obtain relatively high compliance, with respect to vertical movements of the pen and particularly the nib 38. The tube 37 also serves another important purpose, in that it provides an effective damping action with respect to vertical movements of the ink conduit. Thus, the ink conduit and nib may be moved, in a vertical direction, relatively rapidly and frequently, by operation of the plunger 53, during a receiving operation. Under these circumstances, the nib end of the ink conduit may tend to oscillate or "bounce," which would cause the reproduction of false markings. The tube 37, however, effectively damps such bouncing movements and thereby prevents errors in receiver operation which would otherwise occur.

Hence, while I have illustrated and described the preferred embodiment of my invention, it is to be understood that this is capable of variation and modification.

I claim:

1. A transceiver recording pen assembly for a graphic communication system comprising: an electrically insulating support member; an elongated, flexible, resilient cantilever ink conduit, formed from electrically conductive material, mounted on said support member; a nib member connected to said ink conduit to transfer ink from said conduit to a recording medium; means for releasably mounting a stylus actuator on said support member to move said support member toward and away from said recording medium to engage and disengage said nib means with said recording medium; a contact element, mounted on said support member in position to engage and disengage said ink conduit in electrically conductive contact in response to engagement and disengagement of said nib means with said recording medium; and means for electrically connecting said contact element and said ink conduit to a control circuit to control generation of a pen contact signal in response to engagement and disengagement of said contact element and said ink conduit.

2. A transceiver recording pen assembly for a graphic communication system comprising: an electrically insulating support member; an elongated, flexible, resilient cantilever ink conduit, formed from electrically conductive material, mounted on said support member; a nib member connected to said ink conduit to transfer ink from said conduit to a recording medium; a first electrically conductive contact element mounted on said ink conduit, in electrical contact therewith, adjacent said nib; means, including an electrically conductive keeper member mounted on said support member, for releasably mounting a stylus actuator on said support member to move said support member toward and away from said recording medium to engage and disengage said nib means with said recording medium; a second contact element, mounted on said keeper member and normally spaced from said first contact element but engageable with said first contact element in electrically conductive contact whenever said nib means engages said recording medium; and means for electrically connecting said keeper member and said ink conduit to a control circuit to control generation of a pen contact signal in response to engagement and disengagement of said contact elements.

3. A transceiver recording pen assembly for a graphic communication system comprising: an electrically insulating support member; an elongated, flexible, resilient cantilever ink conduit mounted on said support member, said conduit including two sections of conductive metal tubing interconnected by a length of highly flexible tubing of dielectric material and an electrically conductive spring member electrically interconnected said two conductive sections; a nib member connected to said ink conduit to transfer ink from said conduit to a recording medium; means for releasably mounting a stylus actuator on said support member to move said support member toward and away from said recording medium to engage and disengage said nib means with said recording medium; a contact element, mounted on said support member and normally spaced from said ink conduit but engageable with one section of said ink conduit in electrically conductive contact whenever said nib means engages said recording medium; and means for electrically connecting said contact element and the other section of said ink conduit to a control circuit to control generation of a pen contact signal in response to engagement and disengagement of said contact element and said one section of said ink conduit.

4. A transceiver recording pen assembly for a graphic communication system comprising: an electrically insulating support member having an elongated channel therein; an elongated, flexible, resilient cantilever ink conduit, formed from electrically conductive material, having one end affixed to said support member and extending along said channel; a nib member, connected to said ink conduit adjacent the free end thereof, for transferring ink from said conduit to a recording medium; means for releasably mounting a stylus actuator on said support member to move said support member toward and away from said recording medium to engage and disengage said nib means with said recording medium; a contact element, mounted on said support member and normally spaced from said ink conduit but engageable with said ink conduit in electrically conductive contact whenever said nib means engages said recording medium; a cantilever positioning member, mounted in said channel of said support member between said support member and said ink conduit; adjusting means, mounted on said support member, for deflecting said positioning member into engagement with said ink conduit to adjust the spacing between said conduit and said contact element; and means for electrically connecting said contact element and said ink conduit to a control circuit to control generation of a pen contact signal in response to engagement and disengagement of said contact element and said ink conduit.

5. A transceiver recording pen assembly for a graphic communication system comprising: an electrically insulating support member; an elongated, flexible, resilient cantilever ink conduit, formed from electrically conductive material, mounted on said support member; a nib member connected to said ink conduit to transfer ink from said conduit to a recording medium; guide means, comprising a guide key affixed to said conduit and engaged in sliding contact with said guide member, for limiting flexural movement of said ink conduit, relative to said support member, to a direction substantially normal to the recording medium; a first contact element mounted on said ink conduit, means for releasably mounting a stylus actuator on said support member to move said support member toward and away from said recording medium to engage and disengage said nib means with said recording medium; a second contact element, mounted on said support member and normally spaced from said first contact element but engageable with said first contact element in electrically conductive contact whenever said nib means engages said recording medium; and means for individually electrically connecting said contact elements to a control circuit to control generation of a pen contact signal.

6. A transceiver recording pen assembly for a graphic communication system comprising: a support member; an elongated, flexible, resilient cantilever ink conduit mounted on said support member, said conduit including two sections of relatively rigid resilient metal tubing interconnected by a length of flexible tubing of organic material; a nib member connected to said ink conduit to transfer ink from said conduit to a recording medium; and means mounted on said support member to move said conduit relative to said support member and toward and away from said recording medium to engage and disengage said nib means with said recording medium, said means comprising a plunger for engaging and bending said cantilever ink conduit, said flexible tubing being effective to damp vertical oscillations of said ink conduit and said nib member.

7. A transceiver recording pen assembly for a graphic communication system comprising: an electrically insulating support member; an elongated, flexible, resilient cantilever ink conduit mounted on said support member, said conduit including two sections of conductive metal tubing interconnected by a damping member comprising a length of flexible plastic tubing and an electrically conductive spring member electrically interconnecting said two conductive sections; a nib member connected to said ink conduit to transfer ink from said conduit to a recording medium; means for releasably mounting a stylus actuator on said support member to move said support member toward and away from said recording medium to engage and disengage said nib means with said recording medium; means for moving said ink conduit, relative to said support member, comprising a movable element for engaging and bending said ink conduit; a contact element, mounted on said support member and normally spaced from said ink conduit but engageable with one section of said ink conduit in electrically conductive contact whenever said nib means engages said recording medium; and means for electrically connecting said contact element and the other section of said ink conduit to a control circuit to control generation of a pen contact signal in response to engagement and disengagement of said contact element and said one section of said ink conduit.

References Cited in the file of this patent
UNITED STATES PATENTS

| | | |
|---|---|---|
| 1,849,084 | Hand | Mar. 15, 1932 |
| 1,901,673 | Sleeper | Mar. 14, 1933 |
| 2,176,777 | Tate | Oct. 17, 1939 |
| 2,590,294 | Both | Mar. 25, 1952 |
| 2,692,301 | Ress | Oct. 19, 1954 |